(12) United States Patent
Stefansky et al.

(10) Patent No.: US 6,320,730 B1
(45) Date of Patent: Nov. 20, 2001

(54) LOW-STRESS DISC DRIVE MICROACTUATOR CRADLE

(75) Inventors: Frederick Mark Stefansky, Longmont; Rishi Kant, Boulder, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/359,109

(22) Filed: Jul. 22, 1999

Related U.S. Application Data

(60) Provisional application No. 60/102,245, filed on Sep. 26, 1998.

(51) Int. Cl.⁷ .................................................. G11B 5/56
(52) U.S. Cl. ................................................. 360/294.4
(58) Field of Search .................. 360/294.4, 294.5, 360/294.6, 294.3, 292

(56) References Cited

U.S. PATENT DOCUMENTS

| | | | |
|---|---|---|---|
| 3,924,268 | 12/1975 | McIntosh et al. | 360/78 |
| 4,374,402 | 2/1983 | Blessom et al. | |
| 4,651,242 | 3/1987 | Hirano et al. | |
| 4,764,829 | 8/1988 | Makino | |
| 4,914,725 | 4/1990 | Belser et al. | 318/560 |
| 5,021,906 | 6/1991 | Chang et al. | |
| 5,034,828 | 7/1991 | Ananth et al. | 360/75 |
| 5,177,652 | 1/1993 | Yamaguchi et al. | 360/78.05 |
| 5,189,578 | 2/1993 | Mori et al. | |
| 5,303,105 | 4/1994 | Jorgenson | |
| 5,364,742 | 11/1994 | Fan et al. | 430/317 |
| 5,521,778 | 5/1996 | Boutaghou | |
| 5,657,188 | 8/1997 | Jurgenson et al. | |
| 5,745,319 | 4/1998 | Takekado et al. | 360/78.05 |
| 5,764,444 | 6/1998 | Imamura et al. | |
| 5,781,381 | 7/1998 | Koganezawa et al. | |
| 5,796,558 | 8/1998 | Hanrahan et al. | |
| 5,805,375 | 9/1998 | Fan et al. | 360/78.12 |
| 5,856,896 | 1/1999 | Berg et al. | |
| 5,867,347 | 2/1999 | Knight et al. | |
| 5,896,246 | 4/1999 | Budde et al. | |
| 5,898,541 | 4/1999 | Boutaghou et al. | |
| 5,898,544 | 4/1999 | Krinke et al. | |

FOREIGN PATENT DOCUMENTS

| | | |
|---|---|---|
| 0 412 221 B1 | 11/1989 | (EP) . |
| 63-122069 | 5/1988 | (JP) . |
| 02-263369 | 4/1989 | (JP) . |
| 04-134681 | 5/1992 | (JP) . |
| 04-368676 | 12/1992 | (JP) . |
| 05-094682 | 4/1993 | (JP) . |
| 06-020412 | 1/1994 | (JP) . |
| 07-085621 | 3/1995 | (JP) . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Allen Cao
(74) *Attorney, Agent, or Firm*—Kinney & Lange, P.A.

(57) ABSTRACT

A dual-stage actuation assembly for a disc drive includes a movable actuator arm and a load beam connected to the actuator arm. A pad is attached to the load beam, and a hinge extends from the pad. A microactuator cradle is attached to the pad by the hinge, and includes a slider support structure having first and second beams that are bendable in response to control signals and a gimbal attached to the slider support structure for supporting the slider between the first and second beams over a surface of a disc. A first piezoelectric element is coupled to the first beam for bending the first beam in response to control signals in a selected direction, and a second piezoelectric element is coupled to the second beam for bending the second beam in response to the control signals in the selected direction. Bending of the first and second beams causes the microactuator cradle to rotate with respect to the pad about the hinge in a plane generally parallel to the surface of the disc, thereby effecting high resolution displacement of the transducing head carried by the slider.

14 Claims, 4 Drawing Sheets

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–½Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

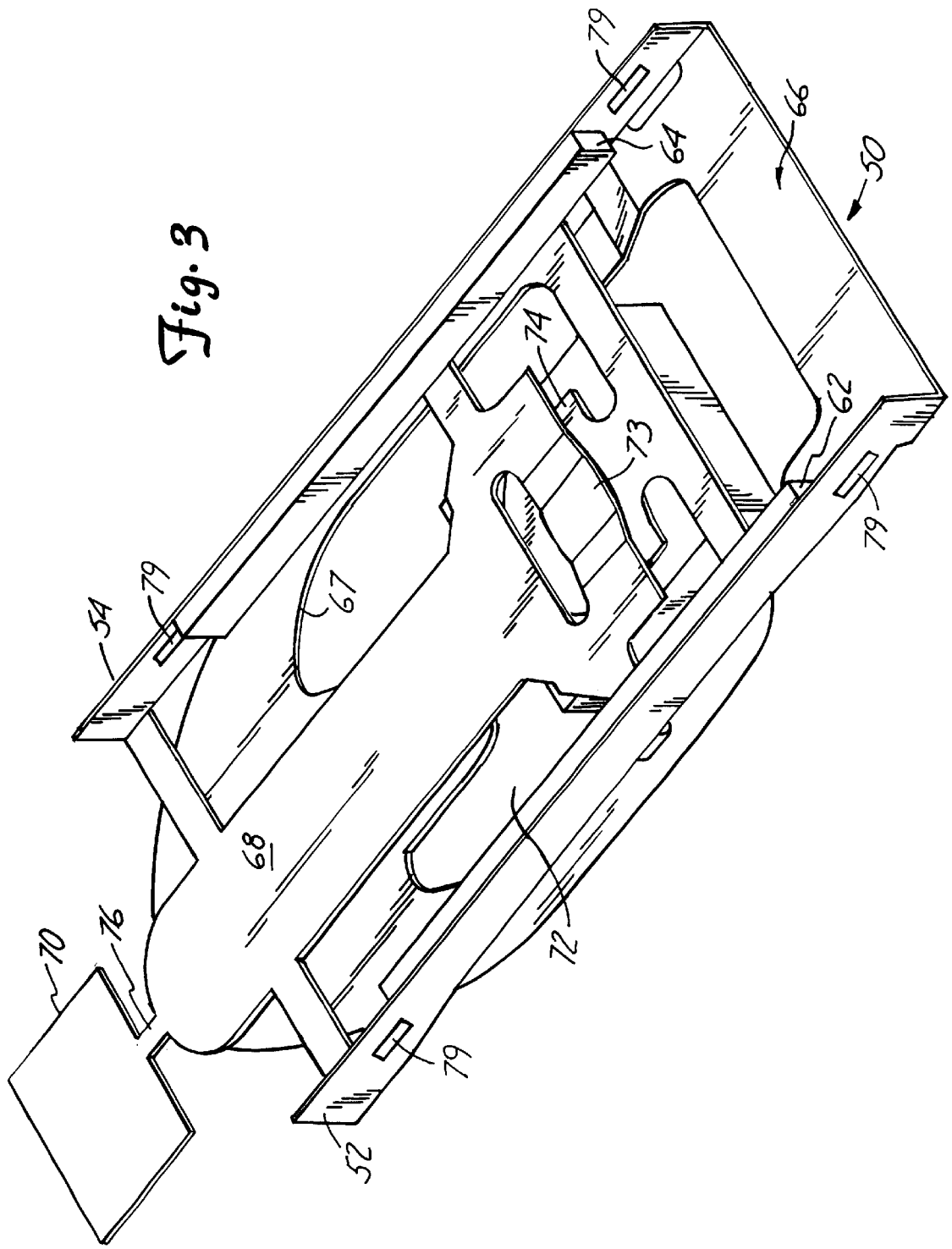

LOW-STRESS DISC DRIVE MICROACTUATOR CRADLE

CROSS-REFERENCE TO RELATED APPLICATION(S)

This application claims priority from Provisional Application No. 60/102,245 filed Sep. 26, 1998, for "Microactuator Cradle and Load Beam for Large Stroke and Low Gain in Torsion" by F. M. Stefansky and R. Kant.

BACKGROUND OF THE INVENTION

The present invention relates to a disc drive microactuator, and more particularly to a high resolution head positioning mechanism that includes a lowstress microactuator cradle for improving the stroke and torsional gain characteristics of the microactuator.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional lower resolution actuator motor, thereby effecting head positioning through dual-stage actuation. Various microactuator designs have been considered to accomplish high resolution head positioning. One such design is disclosed in U.S. application Ser. No. 09/289,024 filed Apr. 9, 1999 for "Unitary Synchronous Flexure Microactuator" by R. Kant and F. M. Stefansky, which is hereby incorporated by reference. This design includes a microactuator cradle that carries the entire micro-electronic machine (MEM) that supports the slider and generates high resolution displacement of the slider. The microactuator cradle is mounted a load beam connected to an actuator arm for coarsely positioning and supporting the entire cradle and slider structure over the surface of a disc. There is a continuing need in the art for improved microactuator designs such as the one disclosed in the aforementioned application, to achieve desired characteristics for operation in a disc drive system.

BRIEF SUMMARY OF THE INVENTION

The present invention is a dual-stage actuation assembly for use in a disc drive having a recording disc rotatable about an axis, and a slider supporting a transducing head for transducing data with the disc. The dual-stage actuation assembly supports the slider to position the transducing head adjacent a selected radial track of the disc, and includes a movable actuator arm and a load beam connected to the actuator arm. A microactuator is attached to the load beam, and includes a pad for attachment to the load beam and a hinge extending from the pad. A microactuator cradle is attached to the hinge to support the slider, and includes a slider support structure having first and second beams in a plane generally normal to a surface of the disc and a gimbal attached to the slider. A first piezoelectric element is coupled to the first beam and is bendable in response to control signals to bend the first beam in a selected direction. A second piezoelectric element is coupled to the second beam and is bendable in response to control signals to bend the second beam in the selected direction. Bending of the first and second beams causes rotational displacement of the microactuator cradle with respect to the pad about the hinge, thereby altering the position of the slider with respect to the tracks of the disc.

BRIEF DESCRIPTION OF THE DRAWINGS

FIG. 3 is a perspective view of a microactuator according to the present invention.

DETAILED DESCRIPTION

Figure 1:
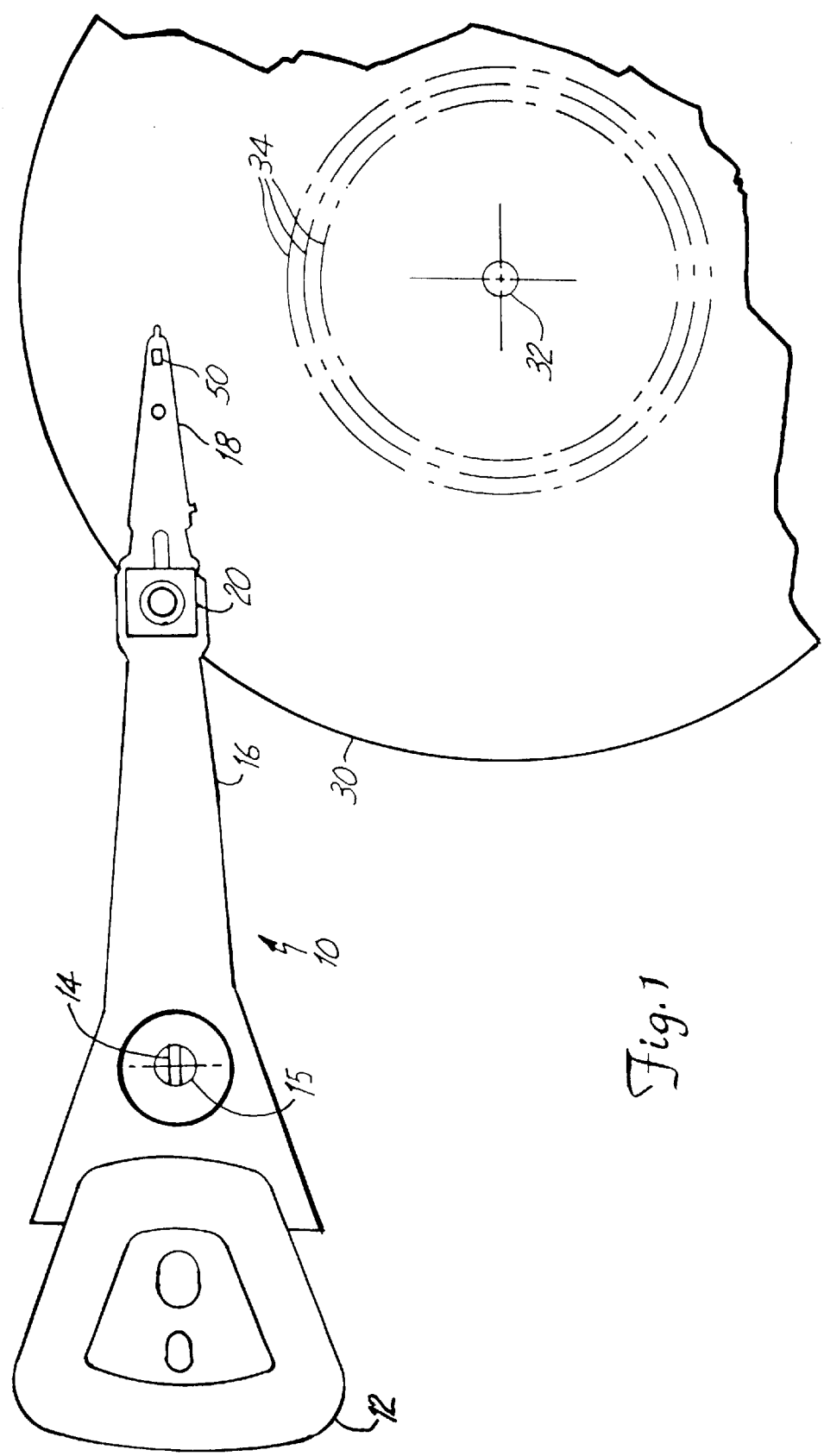
FIG. 1 is a plan view of a dual-stage disc drive actuation system for positioning a slider over tracks of a disc.

FIG. 1 is a plan view of a dual-stage disc drive actuation system 10 for positioning a head-carrying slider over a track 34 of disc 30. Dual-stage actuation system 10 includes voice coil motor (VCM) 12 arranged to rotate actuator arm 16 around axis 14 on spindle 15. Head suspension 18 is connected to actuator arm 16 at head mounting block 20. Microactuator 50 is attached to load beam 18 and carries the slider, which in turn carries a transducing head for reading and/or writing data on concentric tracks of disc 30. Disc 30 rotates around axis 32, so that windage is encountered by the slider to keep it aloft a small distance above the surface of disc 30.

VCM 12 is selectively operated to move actuator arm 16 around axis 14, thereby moving the transducing head carried by the slider between tracks 34 of disc 30. However, for disc drive systems with high track density, VCM 12 lacks sufficient resolution and frequency response to position the transducing head on the slider precisely over a selected track 34 of disc 30. Therefore, a higher resolution actuation device realized by microactuator 50 is necessary.

Figure 2:
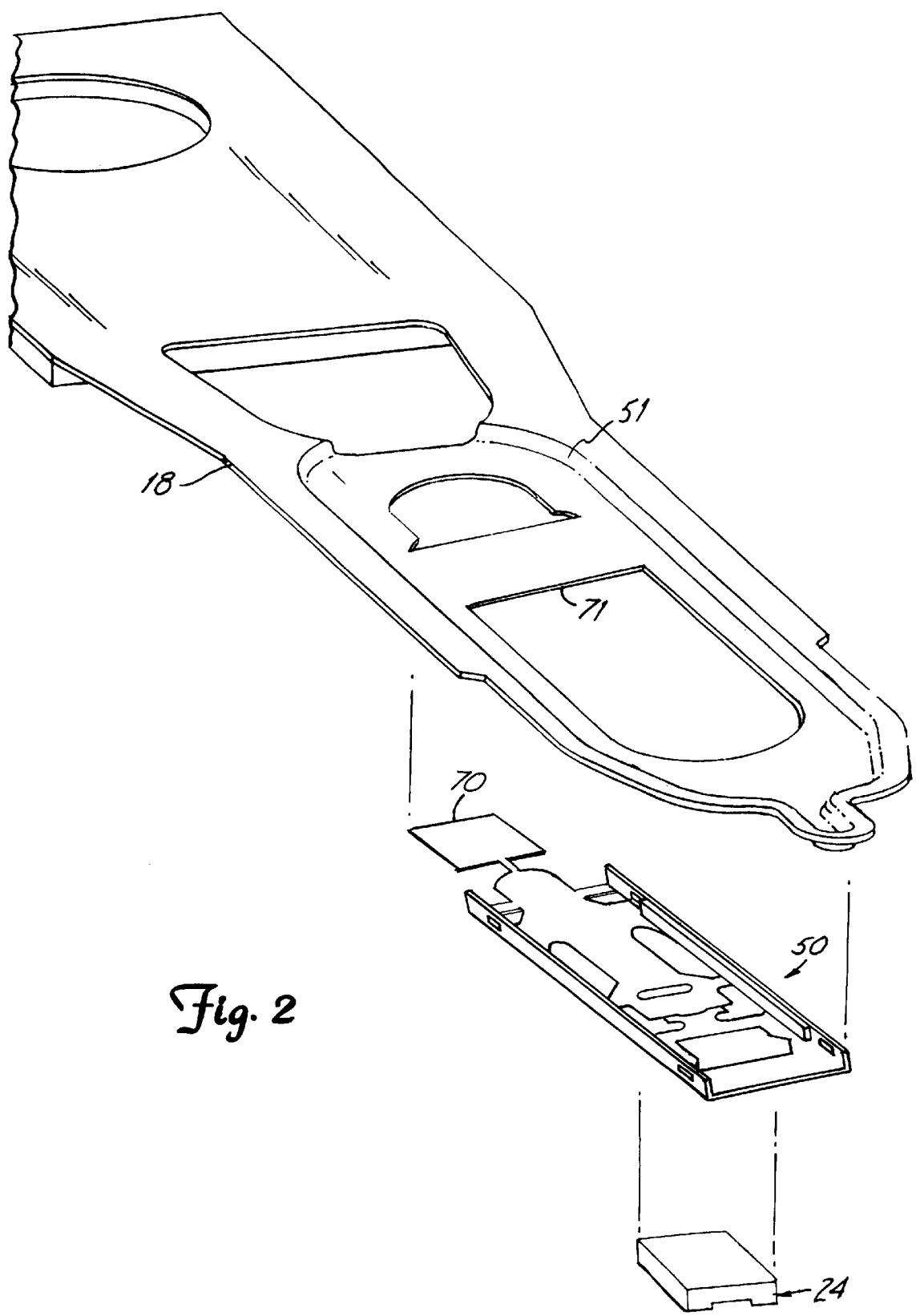
FIG. 2 is an exploded perspective view of a portion of the dual-stage disc drive actuation system shown in FIG. 1, illustrating the microactuator supporting the slider in more detail.

FIG. 2 is an exploded perspective view of a portion of the disc drive system shown in FIG. 1, showing microactuator 50 and its arrangement with respect to load beam 18 in more detail. Microactuator 50 includes an arrangement of bending motors and a slider support structure supporting slider 24 over a surface of a rotating disc. Microactuator 50 is secured to bridge 71 of load beam 18 at pad 70 by welding or another attachment process known in the art. Load beam 18 is formed with shallow depression 51 to provide increased stiffness to resist deformation in the region around pad 70 when microactuator 50 is actuated.

FIG. 3 is a perspective view of microactuator 50 in a quiescent position for utilization in a disc drive according to the present invention. Microactuator 50 includes bent-up beams 52 and 54, connected by cross-beams at either end, forming aperture 72 therebetween. Piezoelectric element 62 is attached to beam 52, and piezoelectric element 64 is attached to beam 54. Slider support structure 66 is attached to rotor 68, which is attached between beams 52 and 54 so as to be suspended within aperture 72 therebetween. In a preferred embodiment, the cross-beam connecting bent-up beams 52 and 54 nearest hinge 76 is attached to rotor 68 at a point immediately adjacent to hinge 76, to provide minimal resistance to bending of rotor 68 about hinge 76. Slider support structure 66 is attached to gimbal 67 which is in turn attached to slider 24 by bonding pad 74. Gimbal 67 provides gimbaling spring to permit some vertical flexibility as slider 24 encounters windage from rotation of the disc therebelow, allowing slider 24 to follow the topography of the disc surface. Pre-load force is applied at load button 73 to maintain slider 24 proximate the surface of the disc. In an exemplary embodiment, slits 79 are provided in beams 52 and 54 to adjust the bending stiffnesses of beams 52 and 54 along their lengths, so that the stiffnesses of beams 52 and 54 are less at their ends than at their centers. The structures of slider support structure 66, including bent-up beams 52 and 54, and gimbal 67 supporting slider 24, make up what is referred to as the microactuator cradle.

Microactuator 50 is rigidly attached at a proximal end to bridge 71 of load beam 18 (FIG. 2) by pad 70. In order to allow rotational movement of rotor 68 upon bending of piezoelectric elements 62 and 64 and beams 52 and 54, rotor 68 is connected to stationary pad 70 by hinge 76, providing horizontal flexibility (in a plane generally parallel to the surface of the disc) to rotor 68. All of the components of microactuator 50 provide sufficient vertical stiffness to support slider 24 over the surface of the disc while microactuator 50 is attached to bridge 71 of load beam 18 only by pad 70.

Figure 4C:
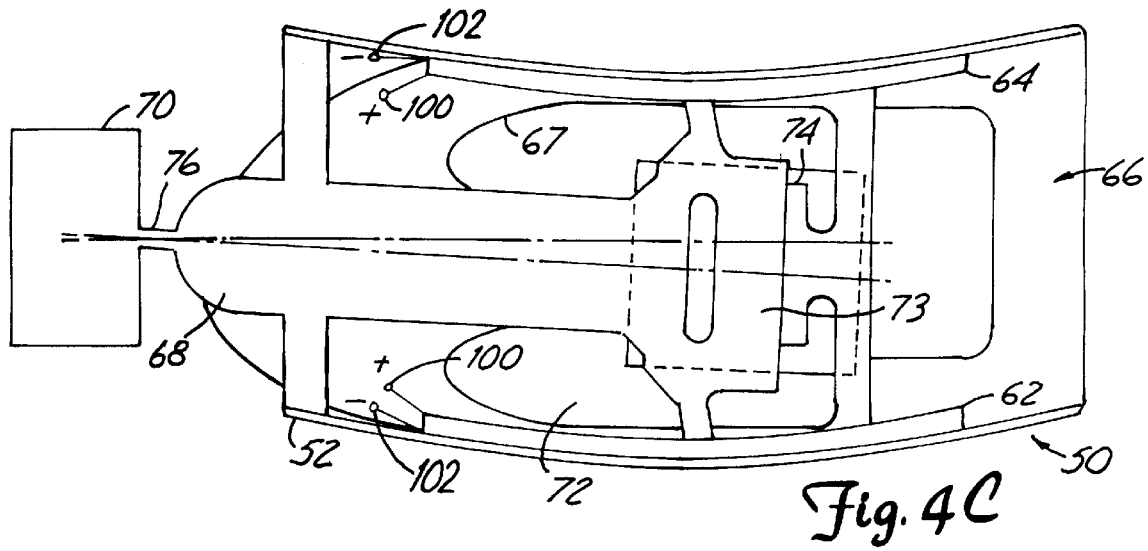
FIG. 4C is a top view of a microactuator in a second actuated position according to the present invention.
Figure 4A:
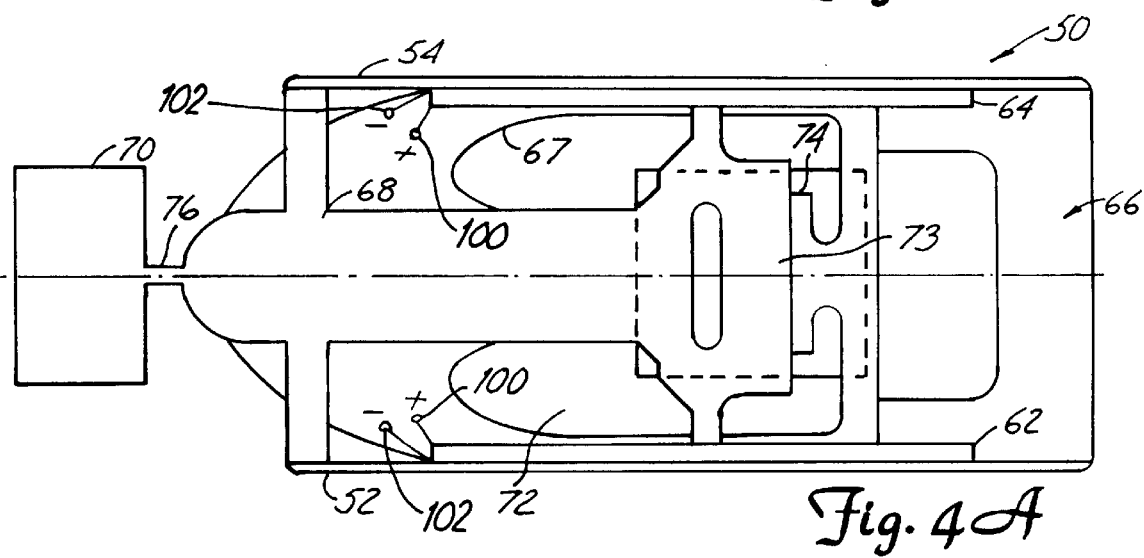
FIG. 4A is top view of a microactuator in a quiescent position according to the present invention.
Figure 4B:
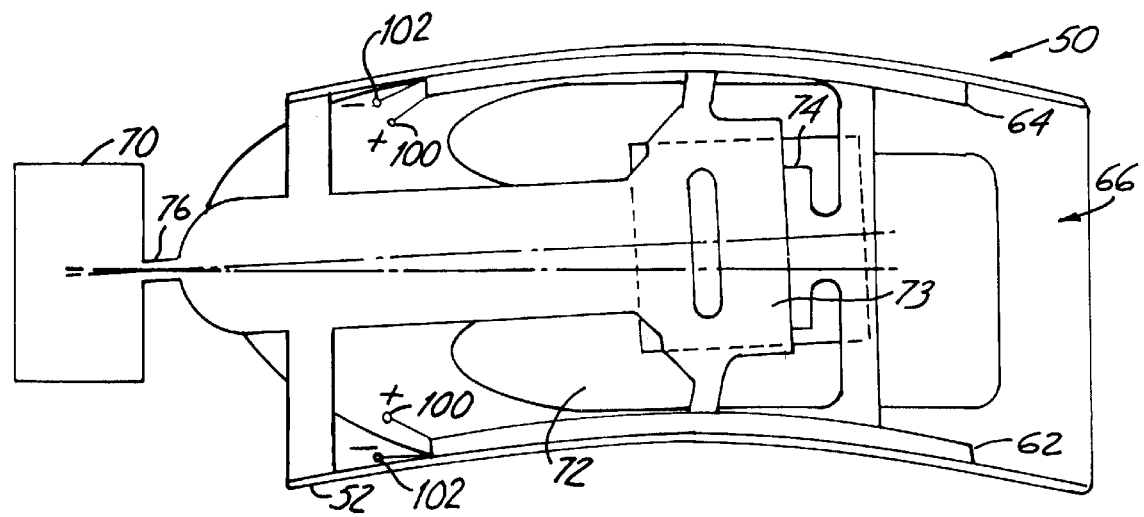
FIG. 4B is a top view of a microactuator in a first actuated position according to the present invention.

FIG. 4A is a top view of microactuator 50 in a quiescent position, and FIGS. 4B and 4C are top views of microactuator 50 in first and second oppositely actuated positions according to the present invention. In an exemplary embodiment, beams 52 and 54 are bent-up pieces formed from the same unitary etched sheet as the remainder of slider support structure 66. Thus, from a mechanical standpoint, beam 52 is effectively restrained at each end where it meets the flat portions of slider support structure 66. Piezoelectric element 62 is preferably poled in the dl3 direction, for operation as a monomorph bending motor. Terminal 100 connects the surface of piezoelectric element 62 most distant from beam 52 to a first potential, while terminal 102 connects the surface of piezoelectric element 62 nearest beam 52 (preferably through a conductive plate attached to the piezoelectric element, which in turn is attached to beam 52 by an insulating adhesive, for example) to a second, opposite potential, thereby creating a potential difference across piezoelectric element 62. Terminals 100 and 102 are pictured schematically in FIGS. 4A, 4B and 4C; the actual electrical connections may be realized by any number of methods known in the art. In an exemplary embodiment, the electrical connection may be made by a flex circuit patterned on the slider suspension.

Piezoelectric element 64 and beam 54 are configured in a similar manner. Because of the unitary construction of beams 52 and 54 and slider support structure 66, from a mechanical standpoint, beam 54 is effectively restrained at each end where it meets the flat portions of slider support structure 66. Piezoelectric element 64 is preferably poled in the $d_{13}$ direction, for operation as a monomorph bending motor. Terminal 100 connects the surface of piezoelectric element 64 most distant from beam 54 to the first potential, while terminal 102 connects the surface of piezoelectric element 64 nearest beam 54 (preferably through a conductive plate attached to the piezoelectric element, which in turn is attached to beam 54 by an insulating adhesive, for example) to a second, opposite potential, thereby creating a potential difference across piezoelectric element 64. The electrical circuit connections to piezoelectric element 64 are opposite to the circuit connections to piezoelectric element 62, to enable complementary bending of piezoelectric element 62 attached to beam 52 and piezoelectric element 64 attached to beam 54.

In operation, when the potential difference between terminals 100 and 102 is applied across piezoelectric elements 62 and 64, the elements expand or contract along their lengths (opposite to one another), forcing complementary bending of piezoelectric elements 62 and 64 and beams 52 and 54 as indicated in FIGS. 4B and 4C. In this way, deflection at points along the lengths of beams 52 and 54 is achieved, which applies force to move the attached slider support structure 66 supporting slider 24. Slider support structure 66, attached to rigid pad 70 by rotor 68, rotates around hinge 76 to effect rotational movement of slider 24 across the tracks of the disc. The opposite directions of movement shown in FIGS. 4B and 4C are simply realized by application of opposite potentials to terminals 100 and 102. In a preferred embodiment, slider support structure 66 is connected to beams 52 and 54 at the longitudinal centers of the piezoelectric elements 62 and 54, so as to achieve maximum deflection.

Under the control of signals applied to terminals 100 and 102, slider support structure 66 and slider 24 move rotationally across tracks of the disc with very little stress. By rigidly attaching the microactuator of the present invention to the disc drive load beam with a hinge formed outside the frame, or cradle, of the microactuator, the microactuator has an additional degree of freedom in the direction of cross-track movement generally parallel to the surface of the disc. As a result, there is low resistance to cross-track movement, enabling greater slider displacement to be achieved for a given force applied by the monomorph bending motors formed by the piezoelectric elements and associated beams. As a result, a suitable microactuator stroke on the order of 30–45 micro-inches may be achieved with relatively short piezoelectric elements, having a length of approximately 0.14–0.16 inches in an exemplary embodiment.

An additional advantage of the hinge arrangement of the present invention is the decoupling of the load beam from bending moments of the microactuator perpendicular to the plane of the microactuator, occurring due to the $d_{33}$ mode of deformation of the piezoelectric crystals. The configuration of the present invention prevents vertical motion of the slider when such bending moments occur, by providing substantial vertical stiffness to those motions. Due to the vertical stiffness of the microactuator beams, the distance and inclination angle between the slider and the disc are maintained effectively constant during operation of the microactuator, which is necessary to preserve the desired flying characteristics of the slider. In an exemplary embodiment, vertical displacement of the slider due to operation of the microactuator is only approximately 1 micro-inch. This is achieved while still providing vertical flexibility of the slider as it follows the topography of the disc surface by providing a separate gimbal (gimbal 67, FIG. 3) to support the slider.

The hinge arrangement of the present invention also serves to insulate the microactuator from low frequency (below about 2500 Hz) torsional (twisting) modes of movement of the load beam. This is achieved because of the additional degree of freedom afforded to the microactuator cradle by the hinged connection to the load beam. As a result, the microactuator cradle (and thus the slider) experiences almost no cross-track motion when low frequency torsion modes of the load beam are excited, reducing the need for high-resolution correction of the slider position upon mere movement of the main actuator motor to coarsely position the load beam and the microactuator cradle.

High frequency torsional modes of movement of the load beam induce sway motion of the microactuator cradle (bending of the microactuator cradle relative to the hinge). Thus, the travel and frequency of this mode of motion maybe controlled by varying the placement and compliance characteristics of hinge 76 (FIG. 3). One way to control the compliance of the hinge is to vary its dimensions, such as thickness and length. For example, in the design pictured in FIG. 3, a hinge thickness of 0.005 inches causes sway motion of the microactuator cradle to occur with a frequency of 8200 Hz with a microactuator stroke of 36 micro-inches. Reducing the length of hinge 76 (FIG. 3) further moves the frequency of sway mode motion to a higher frequency, such as about 10,000 Hz with an acceptable microactuator stroke of about 30 micro-inches. Thus, it will be apparent to one skilled in the art that the microactuator cradle design of the present invention is capable of simple tuning to achieve the desired dynamic characteristics appropriate for a particular disc drive environment.

The microactuator cradle design of the present invention achieves high resolution slider displacement at high frequencies, typically above about 16,000 Hz in an exemplary embodiment. This ensures that the modes of movement performed by the microactuator are distinct from the modes of movement induced by the movement of the main, low-resolution actuator, which occur at lower frequencies, typically below about 10,000 Hz. Thus, the microactuator is able to function fully independently from the operation of the main actuator, simplifying the requirements of the servo control scheme for regulation of the dual-stage actuation system.

In order to achieve the independent operation of the microactuator from the main actuator, the load beam must undergo little or no deformation when the piezoelectric crystals of the microactuator are activated. Thus, the load beam must present substantial stiffness where it is connected to pad 70 adjacent hinge 76 of the microactuator (FIG. 3). As shown in FIG. 2, load beam 18 is designed to include shallow depression 51, providing curvature for additional stiffness of the shell-like structure of load beam 18. As a result, the kinematics of the microactuator are effectively isolated from the kinematics of the main actuator, simplifying the control mechanism used to regulate the dual-stage actuation system.

The design of the microactuator of the present invention performs cross-track movement of the slider that is synchronous with the movement of the piezoelectric bending motor. In other words, a given movement of the piezoelectric bending motors results in movement of the slider and transducing head with a velocity that is proportional to the frequency of piezoelectric materials of the microactuator. This is achieved by the rigid attachment of the slider support structure to the beams of the microactuator motor along the lengths of the beams, preferably at the midpoints or antinodes (points of greatest displacement) of the bending motors, and the high cross-track compliance of the microactuator hinge design. The present invention thus provides a high resolution head positioning system with efficient performance characteristics. The microactuator is resistant to torsional twisting due to forces caused by actuator arm movement or the like, which prevents unwanted cross-track movements and preserves the flying height proximity of the transducing head carried by the slider with respect to the surface of the disc and thereby ensures consistent transducing of data with the disc.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:
   a movable actuator arm;
   a load beam connected to the actuator arm; and
   a microactuator attached to the load beam, the microactuator comprising:
      a pad for attachment to the load beam;
      a hinge extending from the pad;
      a cradle attached to the hinge to support the slider, the cradle including a slider support structure having first and second beams in a plane generally normal to a surface of the disc and a gimbal attached to the slider;
      a first piezoelectric element coupled to the first beam and being bendable in response to control signals to bend the first beam in a selected direction; and
      a second piezoelectric element coupled to the second beam and being bendable in response to control signals to bend the second beam in the selected direction, whereby bending of the first and second beams causes rotational displacement of the microactuator cradle with respect to the pad about the hinge.

2. The disc drive of claim 1, wherein the first and second piezoelectric elements are connected to the first and second beams to operate as monomorph bending motors.

3. The disc drive of claim 1, wherein the bending of the first and second beams causes displacement of the slider of up to about 30–45 micro-inches across the tracks of the disc.

4. The disc drive of claim 3, wherein the first and second piezoelectric elements each have a length of less than about 0.16 inches.

5. The disc drive of claim 1, wherein the slider is displaced no greater than about 1 micro-inch in the plane generally normal to the surface of the disc upon activation of the first and second piezoelectric elements to bend the first and second beams.

6. The disc drive of claim 1, wherein the hinge is located outside an outer frame of the cradle.

7. The disc drive of claim 6, wherein excitement of low frequency torsion modes of the load beam results in movement of the cradle having a gain of less than about 4 dB.

8. The disc drive of claim 6, wherein excitement of high frequency torsion modes of the load beam results in movement of the cradle having a peak gain at a natural frequency, the natural frequency being tunable by varying placement and compliance characteristics of the hinge.

9. The disc drive of claim 1, wherein the load beam includes a shallow depression in its central portion.

10. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:

a movable actuator arm;

a load beam connected to the actuator arm;

a pad attached to the load beam;

a hinge extending from the pad; and a microactuator cradle attached to the pad by the hinge, the microactuator cradle including a slider support structure having first and second beams that are bendable in response to control signals and a gimbal attached to the slider support structure for supporting the slider between the first and second beams over a surface of the disc, wherein bending of the first and second beams causes the microactuator cradle to rotate with respect to the pad about the hinge in a plane generally parallel to the surface of the disc.

11. The disc drive of claim 10, wherein the microactuator cradle further comprises:

a first piezoelectric element coupled to the first beam for bending the first beam in response to the control signals in a selected direction; and a second piezoelectric element coupled to the second beam for bending the second beam in response to the control signals in the second direction.

12. The disc drive of claim 10, wherein the first and second beams are each bent up from flat portions of the slider support structure.

13. The disc drive of claim 10, wherein the movement of the microactuator cradle is effected independently of movement of the actuator arm and the load beam.

14. The disc drive of claim 10, wherein the load beam includes a shallow depression in its central portion.

* * * * *